(12) United States Patent
Reamer

(10) Patent No.: US 7,712,130 B2
(45) Date of Patent: May 4, 2010

(54) MULTICONFIGURABLE DEVICE MASKING SHUNT AND METHOD OF USE

(75) Inventor: Douglas Alan Reamer, Auckland (NZ)

(73) Assignee: Masking Networks, Inc., Reston, VA (US)

( * ) Notice: Subject to any disclaimer, the term of this patent is extended or adjusted under 35 U.S.C. 154(b) by 1574 days.

(21) Appl. No.: 10/396,053

(22) Filed: Mar. 24, 2003

(65) Prior Publication Data

US 2003/0229780 A1      Dec. 11, 2003

(30) Foreign Application Priority Data

Mar. 22, 2002      (NZ) ...................................... 517911

(51) Int. Cl.
*G06F 9/00*      (2006.01)
(52) U.S. Cl. .............................. 726/11; 726/12; 726/13
(58) Field of Classification Search ..................... 726/2, 726/11–13, 22–24; 709/245–246, 238
See application file for complete search history.

(56) References Cited

U.S. PATENT DOCUMENTS 5,757,924 A * 5/1998 Friedman et al. ............ 713/151
6,363,071 B1 * 3/2002 Fink et al. .................... 370/389
6,523,068 B1   2/2003 Beser
7,100,201 B2 * 8/2006 Izatt ............................. 726/11
2003/0140248 A1 * 7/2003 Izatt ........................... 713/201

OTHER PUBLICATIONS (Vincent Jones, Configuration for Transparently Redundant Firewalls, Vs 1.02, White Paper, May 2001).*
IEEE100 (The Authoritative Dictionary of IEEE Standards Terms, 7th edition, ISBN: 0738126012, Dec. 2000), p. 430.*

* cited by examiner

*Primary Examiner*—Kambiz Zand
*Assistant Examiner*—Peter Poltorak
(74) *Attorney, Agent, or Firm*—Raymond G. Areaux, Esq.; Lisa Velez; Carver, Darden, Koretzky, Tessier, Finn, Blossman & Areaux, LLC

(57) ABSTRACT

A multiconfigurable device masking shunt for a network device, preferably, on a secure network having a first mode and a second mode. In the first mode, the shunt cloaks the network device by rendering the network device invisible to upstream and downstream relay devices. During cloaking, the network device's media access control address is substituted with the upstream or downstream relay devices media access control address. In a second mode, the shunt passes inbound and outbound traffic through one of two alternate paths to the secure network from an unsecure network and can monitor such traffic.

47 Claims, 15 Drawing Sheets

Redundant Internet Connection

Firewall Cloaking Mode

Redundant Internet Connection

Device Masking Shunt

Front Panel Representation

MULTICONFIGURABLE DEVICE MASKING SHUNT AND METHOD OF USE

COPENDING RELATED DATA

This application claims the benefit of priority provisional New Zealand patent application having application number 517911, titled "Computer network and/or telecommunications failsafe and redirection device", filed Mar. 22, 2002.

FIELD OF THE INVENTION

The present invention relates to computer network protection devices and, more particularly, to device masking shunts, and more particularly, to a device masking shunt that is multiconfigurable to function in a manner that cloaks a firewall or other network device in a first mode and a buffered switching wiretap monitoring with backup switchover in another mode.

BACKGROUND OF THE INVENTION

Frame-based communications protocols may embed device specific data as part of the frame. For example, in 100BASE-TX the SA (source address) frame may contain codes which indicate the manufacture and modelnumber of the source device. This information is sometimes known as the media access control (MAC) originating address. The MAC address is an address specific to the type of network hardware and thus provides invaluable information, such as the manufacturer and model number, to a hacker. Capturing the MAC originating address while not simple is sought after by the everyday hacker. The capture of a firewall's MAC originating address provides a doorway into the secure system being protected by the firewall. There are numerous other network devices that employ MAC originating address such as network cards.

The first phase of hacking into a network is the discovery phase which gets the password, IP (internet protocol) address in a dumpster or a network's topology. The hacker sniffs about the network or performs a network scan. In such instances, the firewall's MAC originating address can be captured, thus identifying the manufacturer and model number of the firewall's network interface(s).

One attempt to conceal the MAC originating address of the firewall is to spoof (fake) a MAC originating address (since the communication standards requires a packet to be assembled with a MAC originating address). However, the transmissions with an invalid MAC originating address do not generally conceal or render the device invisible since a pattern of invalid address might eventually be detected.

It is now possible with Linux and OpenBSD to create transparent bridging firewalls. What all bridges tend to have in common is that, although they sit in the middle of a connection between two machines, the two machines do not know that the bridge is there. Ethernet bridging takes place at Layer 2 (network layer) on the ISO stack. The Linux/OpenBSD bridging system needs no IP address. It does not even need to reveal its Ethernet address. The only telltale sign that a filter might be there is that latency is somewhat higher, and that packets do not seem to make it to their final destination. While, the Linux/OpenBSD solution functions as intended, such solution is operating system dependant, vulnerable to tampering or hacking and is not easily adaptable to a variety of network devices and applications.

In view of the above, there is a continuing need for a device masking shunt to assist in providing a transparent bridging function that is independent of an operating system (in other words, does not use or require an operating system) and as such would be tamper proof. The transparent bridging function can then be used to hide firewalls (or other devices or networks), monitor traffic, or provide a redundancy switchover function.

Additionally, there is a continuing need for a firewall that can be configured in promiscuous mode to pass IP addresses straight through and which would not divulge its MAC address for any IP level requests.

Furthermore, there is a continuing need for a device masking shunt that can be used defensively to aid in the securing of a network and which both monitors operations of a firewall and automatically takes corrective action in the event of failure or network saturation.

As will be seen more fully below, the present invention is substantially different in structure, methodology and approach from that of the prior bridging devices.

SUMMARY OF THE INVENTION

The preferred embodiment of the multiconfigurable device masking shunt of the present invention solves the aforementioned problems in a straight forward and simple manner.

Broadly, what is contemplated is a device masking shunt for communication networks comprising: means for capturing and storing a source media access control (MAC) originating address of an inbound received frame; and means for substituting a device MAC originating address in each respective outbound frame of a network device with the stored source MAC originating address to conceal an identity of said network device.

Additionally, what is contemplated is a multiconfigurable device masking shunt for a network device on a secure network comprising: means for cloaking said network device, said network device having a predetermined media access control address, and rendering said network device invisible, in a first mode, to upstream and downstream relay devices; and means for passing inbound and outbound traffic through one of two alternate paths to said secure network, in said second mode.

Moreover, what is contemplated is a defensive intrusion detection system for communication networks comprising: a primary device masking shunt functioning to cloak an identity of first network device; a secondary device masking shunt functioning to cloak an identity of a second network device; and a monitoring device masking shunt for invisibly monitoring traffic through said first network device and communicating invisibly said monitored traffic through said first network device wherein upon detection of degraded performance of said first network device, said monitoring device masking shunt switches paths to invisibly monitor traffic through said second network device and communicate invisibly said monitored traffic through said second network device.

It is an object of the present invention to provide a multiconfigurable device masking shunt that can be connected to a networks gateway and/or firewall and relieve a confused or "down" a networks gateway and/or firewall.

It is a still further object of the present invention to provide a multiconfigurable device masking shunt that can be used for invisible forensic traffic capture and analysis.

It is a still further object of the present invention to provide an intrusion detection system that detects and takes correction action in the event of the failure or saturation at the primary firewall/gateway.

In view of the above objects, a feature of the present invention is to provide a multifunctional device masking shunt that can be easily configured by an administrator to conceal the identity of a shunted network device or to monitor and provide path switching to the secure network.

Another feature of the present invention is to provide a device masking shunt that does not increase the frames time to live.

A still further feature of the present invention is to provide a device masking shunt that employs field programmable gated array so that processing is relatively very fast.

A still further feature of the present invention is to provide a device masking shunt that is connected in a communications network to a network device in a manner that renders it invisible.

The above and other objects and features of the present invention will become apparent from the drawings, the description given herein, and the appended claims.

BRIEF DESCRIPTION OF THE DRAWINGS

For a further understanding of the nature and objects of the present invention, reference should had to the following detailed description, taken in conjunction with the accompanying drawings, in which like elements are given the same or analogous reference numbers and wherein.

DETAILED DESCRIPTION OF THE INVENTION

GLOSSARY OF TERMS:

| | |
|---|---|
| ANSI | American National Standards Institute. |
| CSMA/CD | Carrier Sense Multiple Access with Collision Detection |
| CRC | Cyclic Redundancy Check |
| DMS | Device Masking Shunt |
| FDDI | Fibre Distributed Data Interface |
| FPGA | Field Programmable Gate Array |
| IP | Internet Protocol |
| LAN | Local Area Networks |
| LED | Light Emitting Diode |
| MAC | Media Access Control |
| UDP | User Datagram Protocol |
| 100Base-FX | 100 Mbits/s fibre based Ethernet standard. |
| SA | Source Address |

Figure 1:
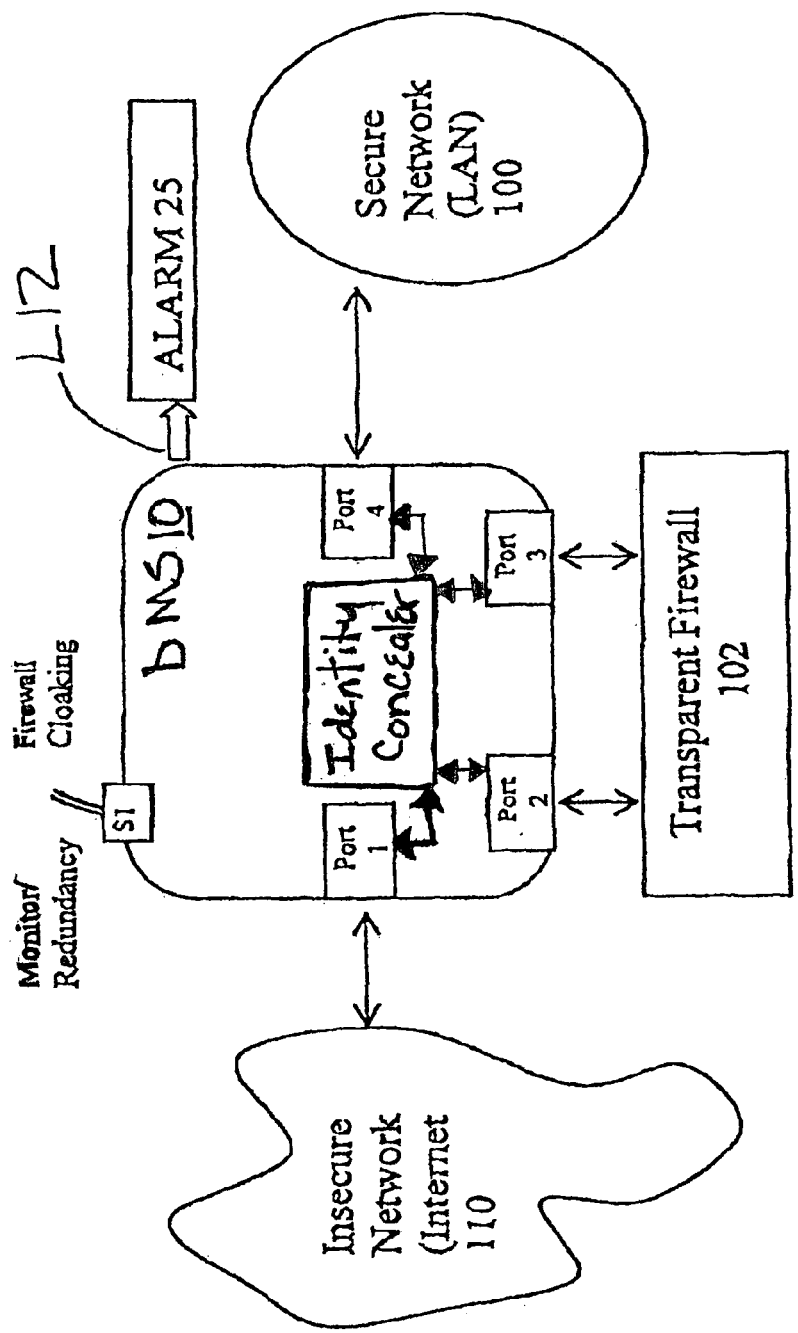
FIG. 1 illustrates a block diagram of a device masking shunt implemented using a firewall cloaking mode in accordance with the present invention.
Figure 2:
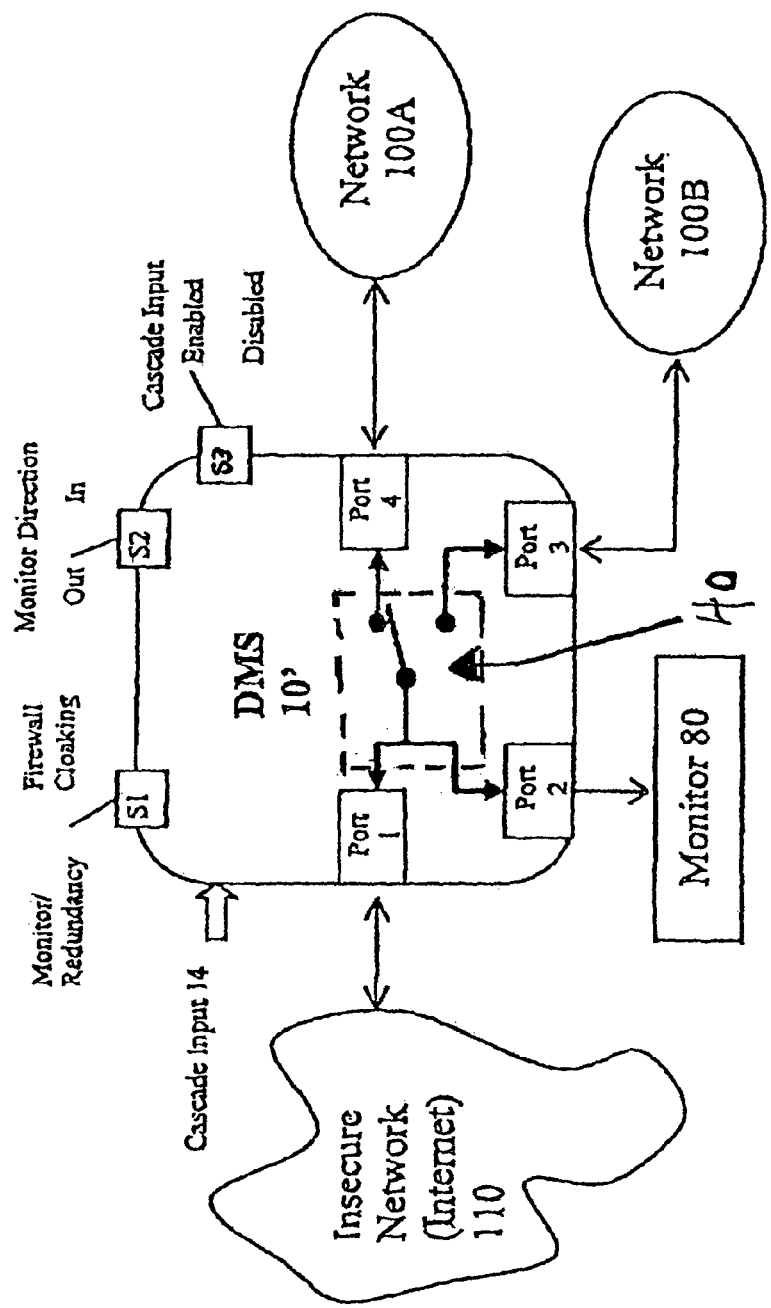
FIG. 2 illustrates a block diagram of a device masking shunt implemented using a redundancy and monitor mode in accordance with the present invention.
Figure 3:
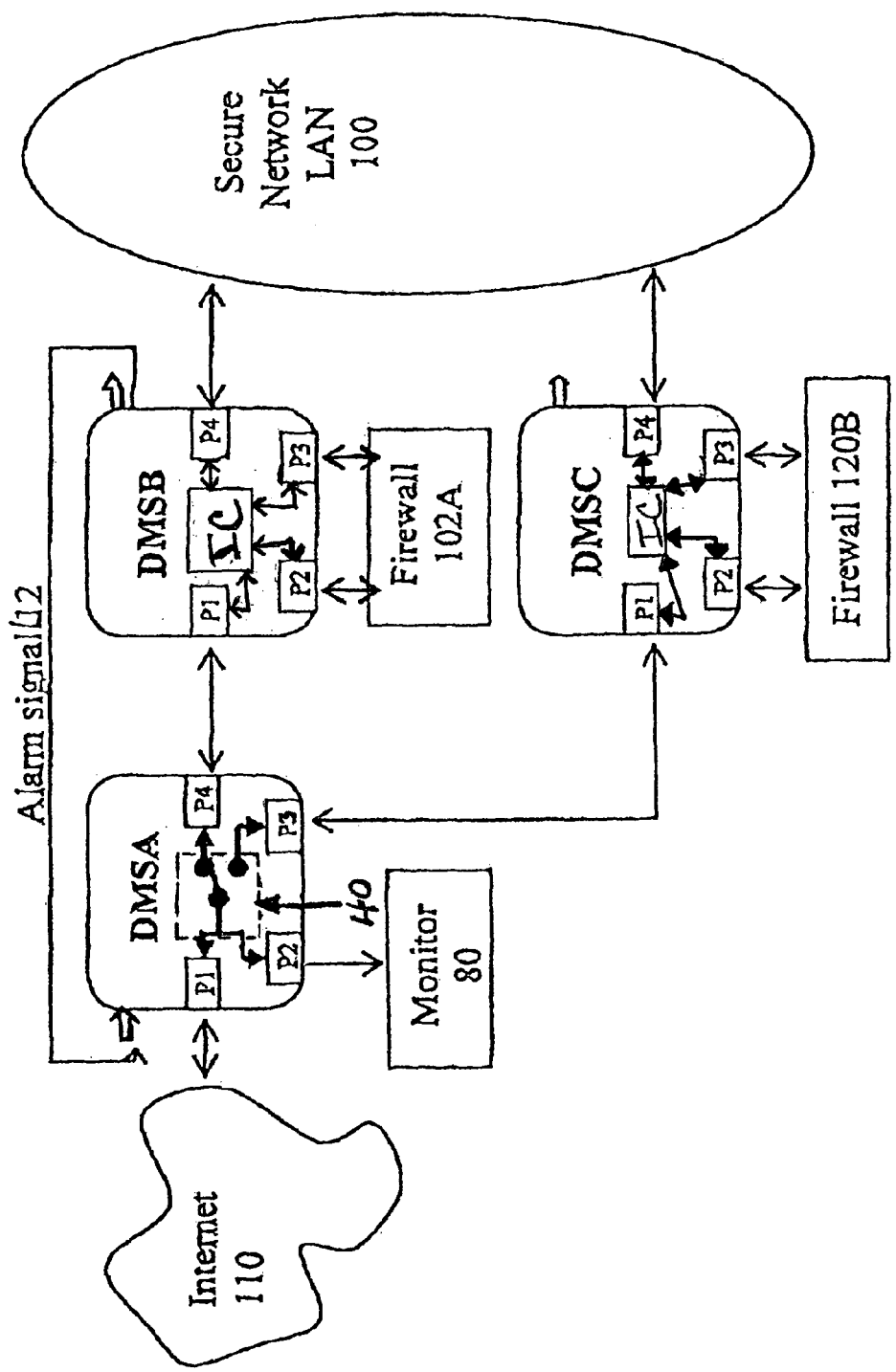
FIG. 3 illustrates a block diagram of a defensive intrusion detection system with multiple device masking shunts in accordance with the present invention.
Figure 4A:
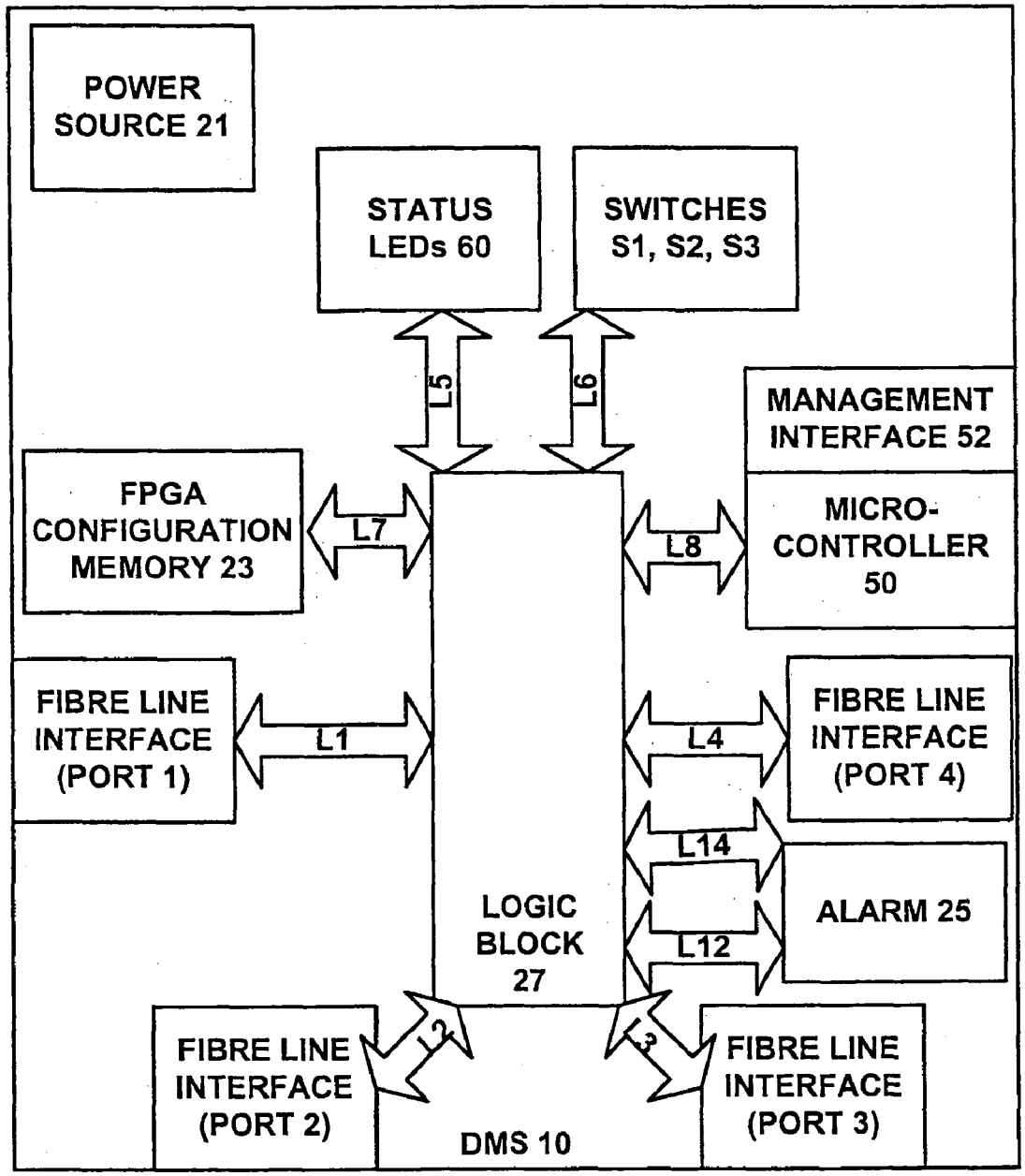
FIG. 4A illustrates a block diagram of a device masking shunt in accordance with the present invention.
Figure 4B:
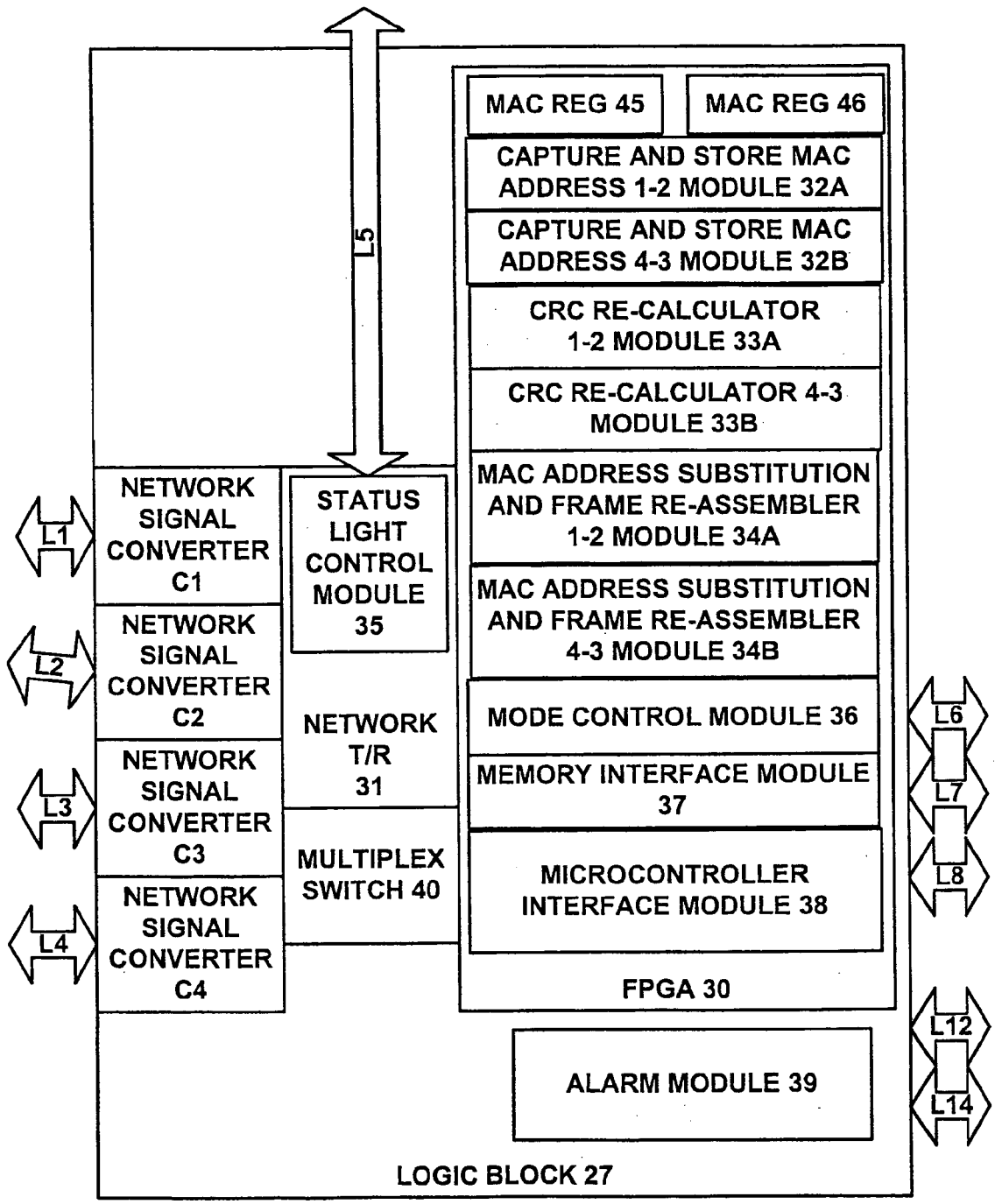
FIG. 4B illustrates a general block diagram of the logic block in accordance with the present invention.

Referring now to FIG. 4A, a general block diagram of the device masking shunt (DMS) 10 is shown. The DMS 10 is configurable to function in one of a firewall cloaking mode, as best seen in FIG. 1 and a redundancy and monitoring mode, as best seen in FIG. 2. Moreover, multiple DMSs A, B, and C can be coupled together for a defensive intrusion detection system as will be described in detail below in relation to FIG. 3.

In the firewall cloaking mode of FIG. 1, there is a very small delay through the DMS 10 so it will not impact the collision domain size. Standard Repeaters or Hubs have delays of 35-40 bits and the IEEE Std 802.3-2002 Class 2 repeater maximum allowable is 46 bits. 100BaseX Ethernet is designed to work with only two 46 bit delay repeaters. A 30 bit delay may be unacceptable as a network with two repeaters already installed could fall over if another one is added.

The bit stream uses 4B/5B NRZI encoding (4 bit data nibbles are encoded into 5 bit symbols with no more than 3 zeros in a row). This gives an actual transmission rate 125 Mbps. While it may be possible to substitute the MAC source address on the fly directly into the encoded data, it is probably impossible to up date the CRC directly using the encoded data. To decode the symbols into nibbles, calculate the CRC and convert back into symbols is a similar process to that done by a repeater and as such the DMS 10 would have similar delays.

While not wishing to be bound by theory, to ensure the DMS 10 operates successfully on all sizes of networks, the DMS 10 implements the firewall cloaking mode as a bridge. But to keep the DMS 10 simple, it is implemented like a repeater. This means the network administrator will have to check that the DMS 10 delays are acceptable for the route that it will be used on. This is unlikely to be a problem as the firewall 102 will typically be functioning like a bridge.

Referring now to FIGS. 1-3, 4A and 4B, the DMS 10 includes a power source 21, a plurality of network ports 1, 2, 3 and 4 and a plurality of control switches S1, S2 and S3 in a DIP switch configuration or the like. In the exemplary embodiment, the plurality of network ports 1, 2, 3 and 4 are Optical Ethernet Ports (Fibre Line Interfaces). Nevertheless, the plurality of network ports 1, 2, 3 and 4 may interface with a cable-based network communication medium, or other wire or wireless network communication mediums.

In the exemplary embodiment, the fibre line interfaces run at 100 Mbit/s only (IEEE802-100Base-FX) and employ a low cost fibre optical interface connector (Duplex SC connector) and 1300 nm multimode fiber. The DMS 10 supports both half duplex and full duplex mode. (This may result in an additional switch being required.)

Each of the network ports 1, 2, 3 and 4 are coupled, via lines L1, L2, L3 and L4, to a respective one of network signal converters C1, C2, C3 and C4 which converts the optical signal to an electrical signal. The converted electrical signal is sent to a field programmable gated array (FPGA) 30 of the logic block 27 via a network transceiver (T/R) 31. The network transceiver (T/R) 31 serves to convert a four (4) bit stream into four (4) bit nibbles for use by the FPGA 30 in its processing. The programming (configuration data for the gate arrays) for the FPGA 30 are stored in the FPGA configuration memory 23. Upon powering up the DMS 10, the programming is loaded into the FPGA 30 via line L7.

Regarding the status light control module 35 and the status LEDs 60 of the DMS 10, the signalling system used for the 100BASE-FX segments is based on the ANSI FDDI signalling system, which sends signals continually, even during idle periods of no network traffic. Therefore, activity on the receive path is sufficient to provide a continual check of link integrity. This is used for the "Link Up" LED, described later in relation to the front panel 59, for each respective one of the ports 1, 2, 3 and 4. The network transceiver (T/R) 31 includes the status light control module 35 and illuminates the status LEDs 60 on the front panel 59 via signals on line L5.

Figure 5:
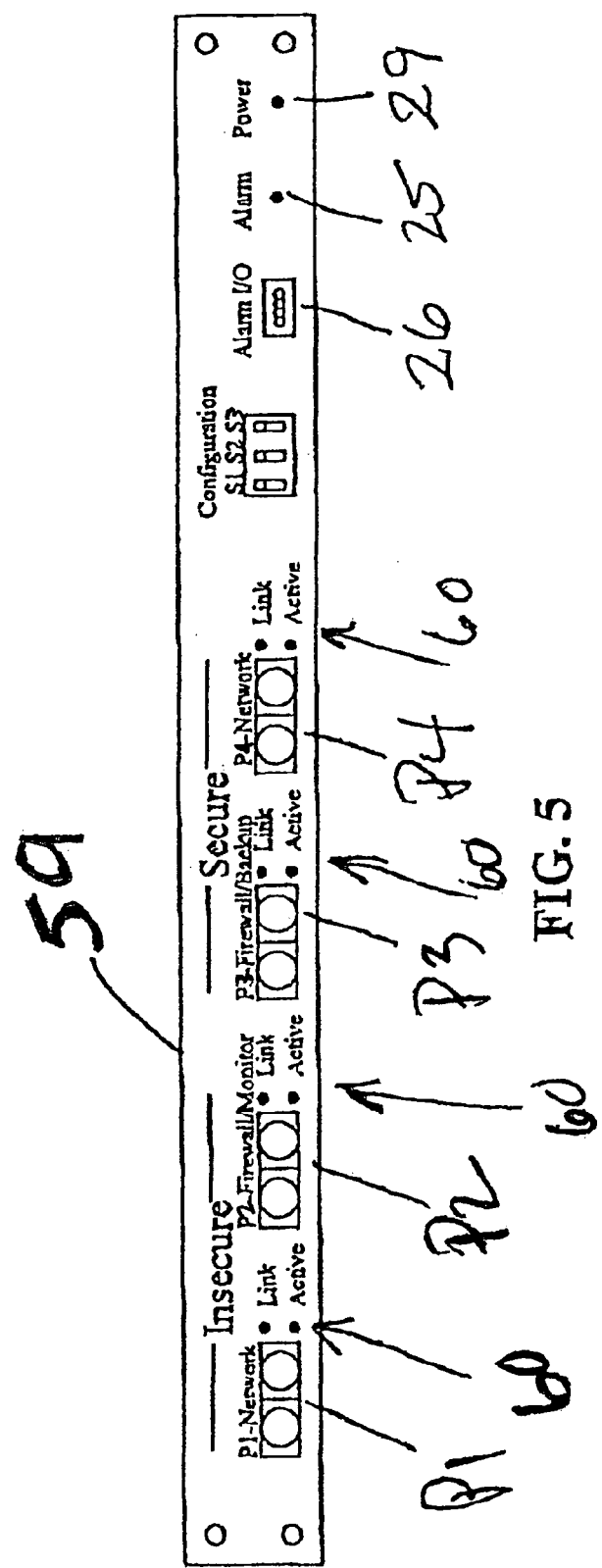
FIG. 5 illustrates a front panel for the device masking shunt of the embodiment of FIG. 4.

In the exemplary embodiment, the LED status indicators 60 includes, without limitation, two green LED's indicating "Link Up" and "Data Activity", as best seen in FIG. 5, for each port 1, 2, 3 and 4. The "Data Activity" LED will include both Tx (transmitting) and Rx (receiving) data activity.

The mode control module 36 serves to reconfigure the operation of the DMS 10 based on the detected switching states on control line L6 of control switches S1, S2 and S3. The control switch S1 is the mode selection switch selecting one of: the firewall cloaking mode and the redundancy and monitoring mode. Control switch S2 is used in the redundancy and monitoring mode and selects the traffic path to monitor 30. Control switch S3 is used in the redundancy and monitor mode and enables the cascade input on line L14. In the preferred embodiment, all switches can be dip switches or the like accessible on the front panel 59, as best seen in FIG. 5. Thus, a network administrator can configure or reconfigure the DMS 10, as desired.

The FGPA 30 further includes, for communications between port 1 and port 2, a first capture and store MAC address module 32A for storing the MAC address at register 45, a first CRC re-calculator module 33A, and a first MAC address substitution and frame re-assembler module 34A, the operation of which are described in relation to FIGS. 6, 8A, 8B and 8C. Additionally, the FPGA 30 includes, for communications between port 3 to port 4, a second capture and store MAC address module 32B, a second CRC re-calculator module 33B and a second MAC address substitution and frame re-assembler module 34B. The details of operation of the capture and store MAC address module 32B and CRC re-calculator module 33B can be readily seen with regard to FIGS. 7, 8A, 8B and 8C.

The DMS 10 further includes an alarm detection module 39 which detects alarm conditions and generates an alarm output on line L12 to alarm 25, a LED status indicator and/or a cascade input on line L14. As best seen in FIGS. 2 and 3, the signalling input and out signals are intended for connectivity between units over a distance of less than 10 meters. The alarm output on line L12 of one device can be connected to the cascade input L14 of another device and their electrical specifications are such that an alarm assertion results in a "cascade input assertion" condition. The alarm output on line L12 is an isolated bipolar contact of less than 50 ohms resistance. The contact shall be normally open and the open state indicating an alarm. Therefore, the DMS 10 will produce an alarm if its power fails or the alarm connecting cable is disconnected. Furthermore, the alarm input will need a jumper or switch (NOT SHOWN) to disable it if it is not used as no connection implies an alarm. The cascade input on line L14 supplies a 5V backed current of not more than 50 mA. A current flowing of less than 10 mA will indicate that the cascade input on line L14 has been activated.

The DMS 10 further includes microprocessor 50 for performing firewall checks, described below, for maintaining the integrity of the firewall 102. A management interface 52 is provided to carry out the firewall checks. The microcontroller interface module 38 of the FPGA 30 basically operates so that the ping control module 500 is a slave to the microcontroller 50.

Referring also to FIG. 5, the DMS 10 is housed in a mountable rack which is fully enclosed in a zinc passivated steel box with an aluminium front panel 59. The front 59 includes the plurality of port connectors P1, P2, P3 and P4 of ports 1, 2, 3 and 4, respectively. Associated with each port connector, the front panel 59 includes the "Link Up" and "Data Activity" LEDs 60 for each of the ports 1, 2, 3 and 4.

The front panel 59 also mounts the control switches S1, S3 and S3 for manual operation thereof. To enable the firewall cloaking mode, switch S1 is positioned to the firewall cloaking mode. Control switch S3 enables the cascade input when switched appropriately. Finally, control switch S2 is only used in the redundancy and monitoring mode and selects the traffic path (incoming or outgoing) to monitor.

The alarm output line L12 is coupled to the input/output I/O alarm connector 26 on front panel 59. The I/O alarm connector 26 is a 4 pin connector used to transport alarms out of or into the DMS 10, such as described in relation to FIG. 3. The alarm 25 is also in the form of an "alarm" LED. However, other alarm indicators can be substituted.

The front panel 59 further includes a "power" LED 29 which illuminates when the DMS 10 is turned on and is receiving power. In the exemplary embodiment a 90-260VAC power source 21 is provided. A rear panel (not shown) is for connecting the power and for housing the main power switch.

The DMS 10 is constructed and arranged to comply with relevant parts of UL 1950 $3^{rd}$ Edition and IEC 60950, FCC Part 15 Subparts A and B—1996 as a class B device (Electromagnetic emissions).

Referring now to FIG. 1, the firewall cloaking mode of the DMS 10 of the present invention will now be described in detail below. The DMS 10 is able to be placed into an Optical Ethernet (secure) network 100 with the characteristic of self invisibility such that the network 100 is not be able to detect the existence of the DMS 10 and conceal the identify of the firewall 102 or other shunted network device. The DMS 10 does not have an IP address and appears transparent at the IP levels and above. Furthermore, the DMS 10 does not have a MAC address. The Optical Ethernet (secure) network 100 is connected to an unsecure network 110 via a firewall 102 and the coupled DMS 10. The firewall 102 is configured in promiscuous mode to pass IP addresses straight through; and, it is highly recommended that the firewall 102 be configured not to divulge its MAC address for any IP level requests (including, without limitation, disabling ARP (Address Resolution Protocol) and RARP (Reverse Address Resolution Protocol).

The DMS 10 has the unsecure network 110, such as the Internet, coupled to port 1, and port 4 is coupled to the secure network 100. Ports 2 and 3 are coupled to the firewall 102. As will be seen from the description provided below, the DMS 10 provides firewall invisibility by hiding (concealing) the firewall's MAC originating address.

The DMS 10 hides (at the data link layer) devices, such as a firewall 102 on network 100. The DMS 10 provides the firewall invisibility by ensuring any outgoing Ethernet frames have a MAC originating address consistent with the MAC originating addresses on the received frames. The DMS 10 does not ensure that an outgoing frame has its correct MAC originating address, just that the originating address is one of the possible addresses from the incoming branch.

The DMS 10 ensures that any monitoring equipment or firewall 102 that may insert its own originating MAC address has such originating MAC address substituted with a valid MAC addresses from the originating area, making the equipment invisible at the data link layer (MAC level).

The operation of the DMS 10 is described in relation to Ethernet frames or packets which are well known and the standards for the communication of such Ethernet frames or packets are well defined. Thus, for the purposes of the present invention, no further description of Ethernet frames or packets are provided.

Figure 6:
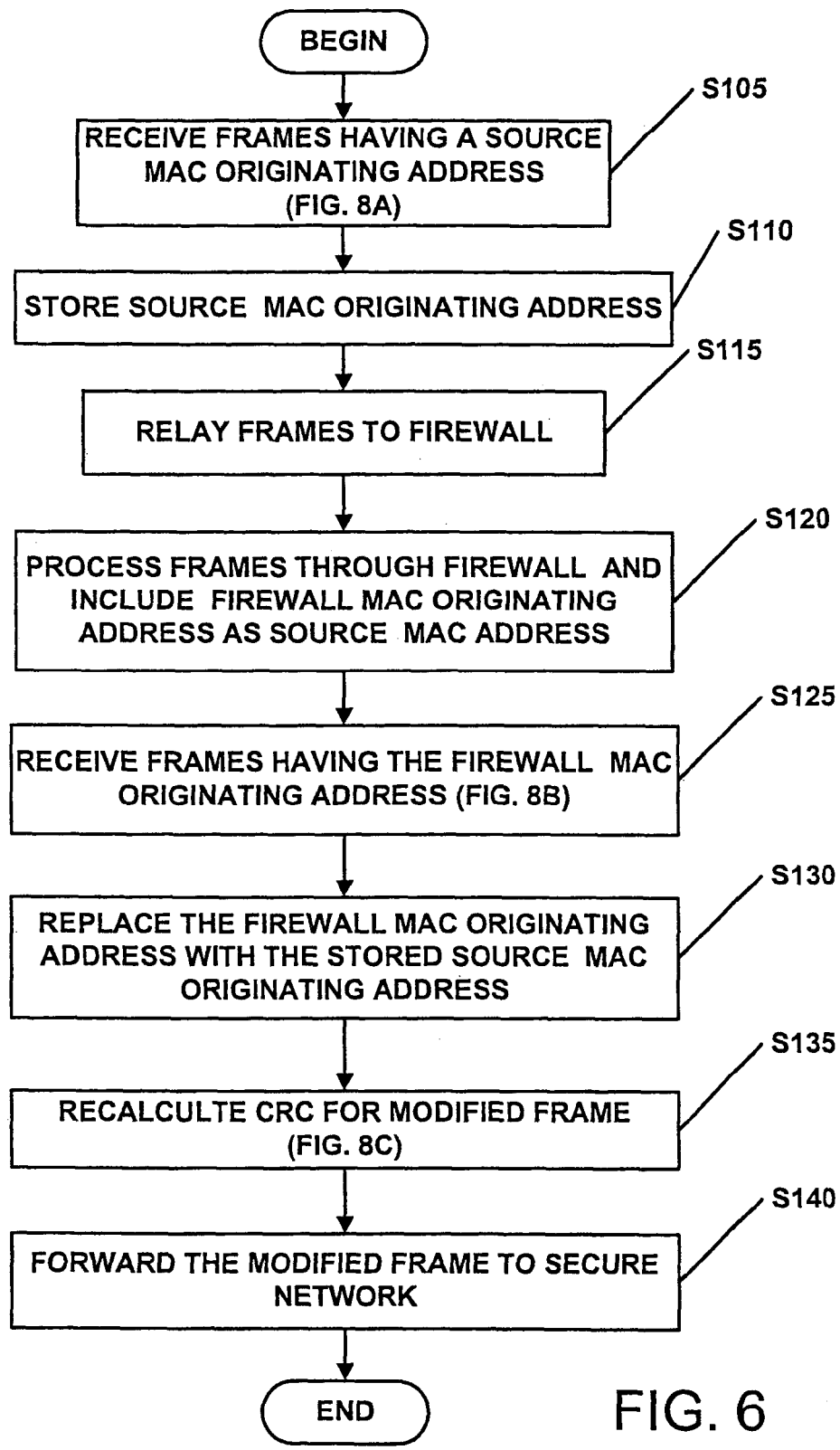
FIG. 6 illustrates a general flowchart of the firewall cloaking mode of the device masking device in accordance with the present invention.

Referring now to FIGS. 1 and 6, the transfer of packet information, during the firewall cloaking mode, through port 1, port 2, port 3 and port 4 will now be described. The basic packet/frame forwarding includes receiving Ethernet frames on port 1 from an unsecure network 110, such as the Internet, at Step S105. Step S105 is followed by Step S110 where the source MAC address is saved in the source MAC address register 45 for port 1 via the capture and store MAC address module 32. Step S110 is followed by Step S115 where the frames are relayed (verbatim) to port 2 of firewall 102. Step S115 is followed by Step S120 where the firewall processes the frames in a conventional manner to pass or fail frames and adds its MAC originating address to any outgoing passing frames. Step S120 is followed by Step S125 where the Ethernet frames from the firewall 102 are transferred (received) at port 3. It should be noted that the source MAC originating address of the frames leaving firewall 102 will most likely be that of the firewall 102.

Step S125 is followed by Step S130 where at port 3 the source MAC originating address is replaced (substituted) with the current source MAC originating address stored in the source MAC address register 45 of port 1 via the MAC address substitution and frame re-assembler module 34. If the source MAC address register 45 of port 1 is empty, the DMS 10 via port 3 will not let the frame through to the secure network 100. Step S130 is followed by Step S135 wherein since the MAC address is changed, the CRC is recalculated for the modified frame via the CRC re-calculator module 33. However, if the original CRC was not valid it is left invalid in the modified frame. Thereafter, the frame from port 3 is forwarded to port 4 and out to the secure network, at Step S140.

The MAC address used in the substitution is the latest source MAC originating address to arrive at port 1 in a first-in, first-out process. In an alternate embodiment, a random assignment from a pool of MAC addresses can also be implemented, if desired but may diminish performance.

The DMS 10 may be detectable by continuously observing the MAC originating address coming back from a repeated message from a device on the other side of a DMS 10. If a DMS 10 is present, the originating address may vary or not match the devices MAC address.

The reverse frame flow through the DMS 10 is essentially symmetrically identical to the port 1, port 2, port 3 and port 4 flow pattern described above. A separate MAC source address register 46 is kept for addresses received at port 4 for use with frames sent out from port 1. Thus, a valid MAC address, such as from a network card, on the secure network 100 is used in the Ethernet frame. The MAC originating address is only the MAC originating address of the last relay point, not necessarily the real originating MAC address. The LAN stations may obtain the correct MAC originating address by asking for it at the IP level.

In the normal operations of a firewall 102, the firewall 102 passes or fails a frame or packet. When a frame fails, the firewall 102 functions to sends a reply to the source that the frame failed. The reply may include the MAC originating address of the firewall pursuant to the address resolution protocol or reverse address resolution protocol. In such a situation, the firewall's MAC originating address can be determined. In the preferred embodiment, the address resolution protocol and/or reverse address resolution protocol should be disabled so that the identity of the MAC originating address can remain hidden.

Figure 7:
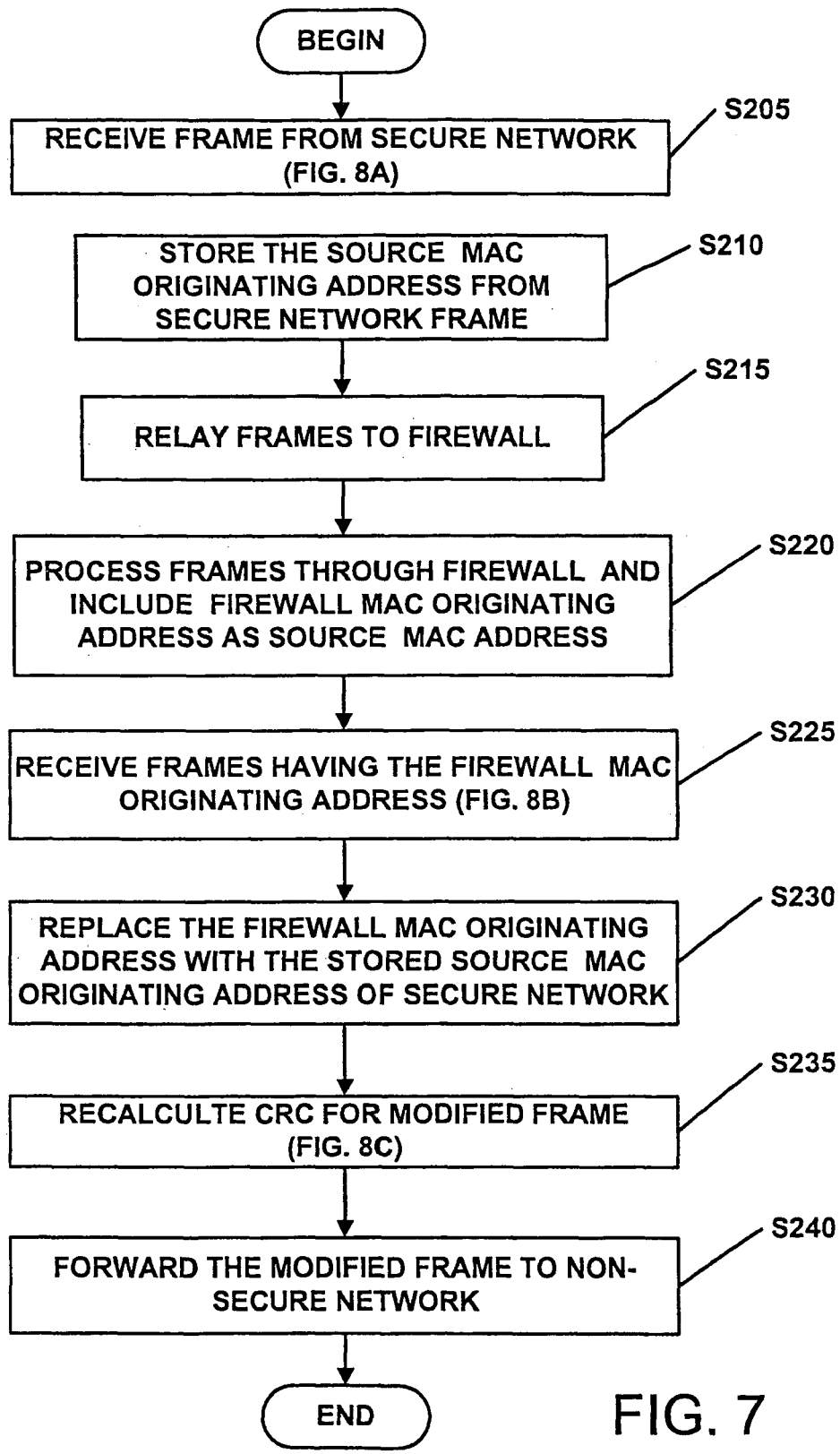
FIG. 7 illustrates a general flowchart of the reverse direction of the firewall cloaking mode of the device masking device in accordance with the present invention.

Referring now to FIG. 7, the reverse transfer of packet information, during the firewall cloaking mode, through port 4, port 3, port 2 and port 1 will now be described. The basic packet/frame forwarding includes at Step S205 receiving a frame from the secure network 100. Step S205 is followed by Step S210 where the MAC originating address in the Ethernet frames on port 4 from the secure network 100 is saved in MAC address register 46. Step S210 is followed by Step S215 where the frames are relayed (verbatim) via port 3 to firewall 102. Step S215 is followed by Step S220 where the firewall processes the frames in a conventional manner and adds its MAC originating address to any outgoing frames. Step S220 is followed by Step S225 where the Ethernet frames from the firewall 102 are transferred (received) at port 2.

Step S225 is followed by Step S230 where at port 2 the firewall MAC originating address is replaced with the current source MAC originating address stored in the source MAC address register 124 of port 4. If the source MAC address register 46 for port 4 is empty, the DMS 10 via port 2 will not let the frame through to the unsecure network 110. Step S230 is followed by Step S235 wherein since the MAC address is changed, the CRC is recalculated for the modified frame. Thereafter, the frame from port 2 is forwarded to port 1 and out to the unsecure network, at Step S240.

Figure 8A:
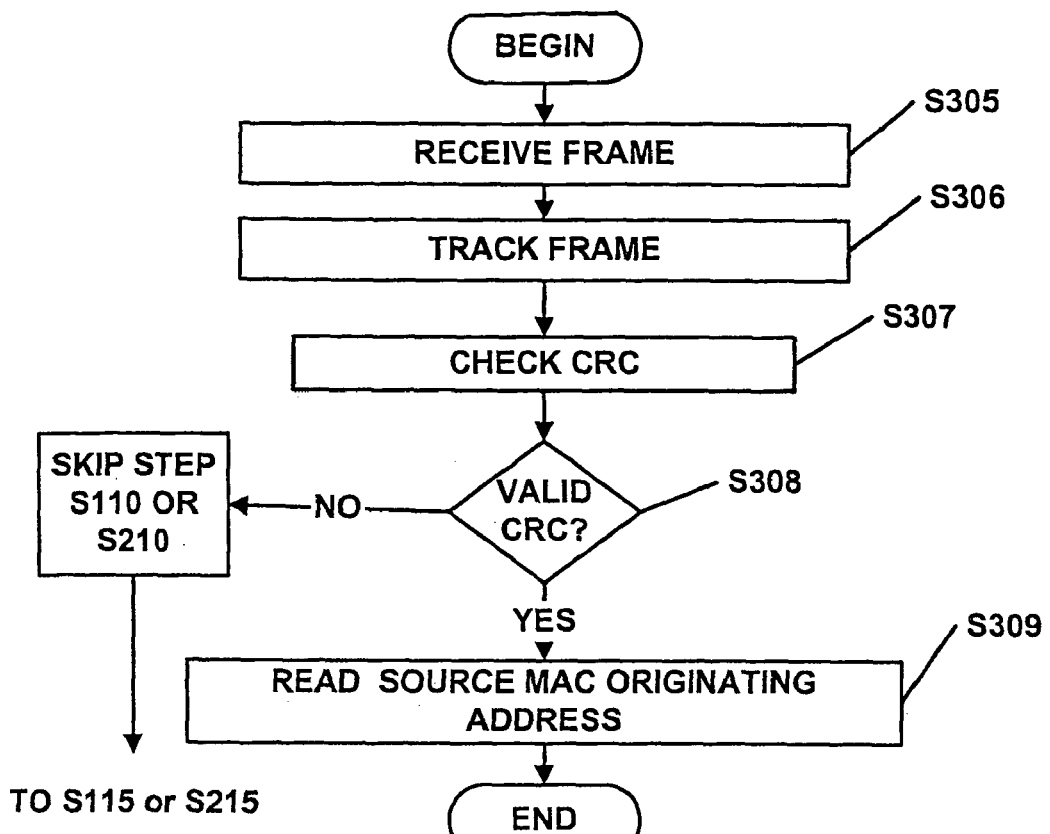
FIG. 8A illustrates a general flowchart of the process for receiving frames from the unsecure and secure networks.

Referring now to Step S105 (FIG. 6) or Step S205 (FIG. 7), these steps of receiving frames includes the steps identified in FIG. 8A and begins with Step S305. The frame is received at Step S305. Step S305 is followed by Step S306 where FPGA 30 tracks the received frame from port 1 or port 4. Step S306 is followed by Step S307 where the CRC is checked. Step S307 is followed by Step S308 where a determination is made whether the CRC is valid. If the determination is "YES", the source MAC originating address is read in the received frame at Step S309. However, if the determination is "NO", at Step S308, the Step S110 (FIG. 6) or Step S210 (FIG. 7) are skipped. Thus, the source MAC originating address in the currently received frame is not stored and the MAC register 45 (if the frame is received from port 1) or the MAC register 46 (if the frame is received from port 4) is not updated.

Figure 8C:
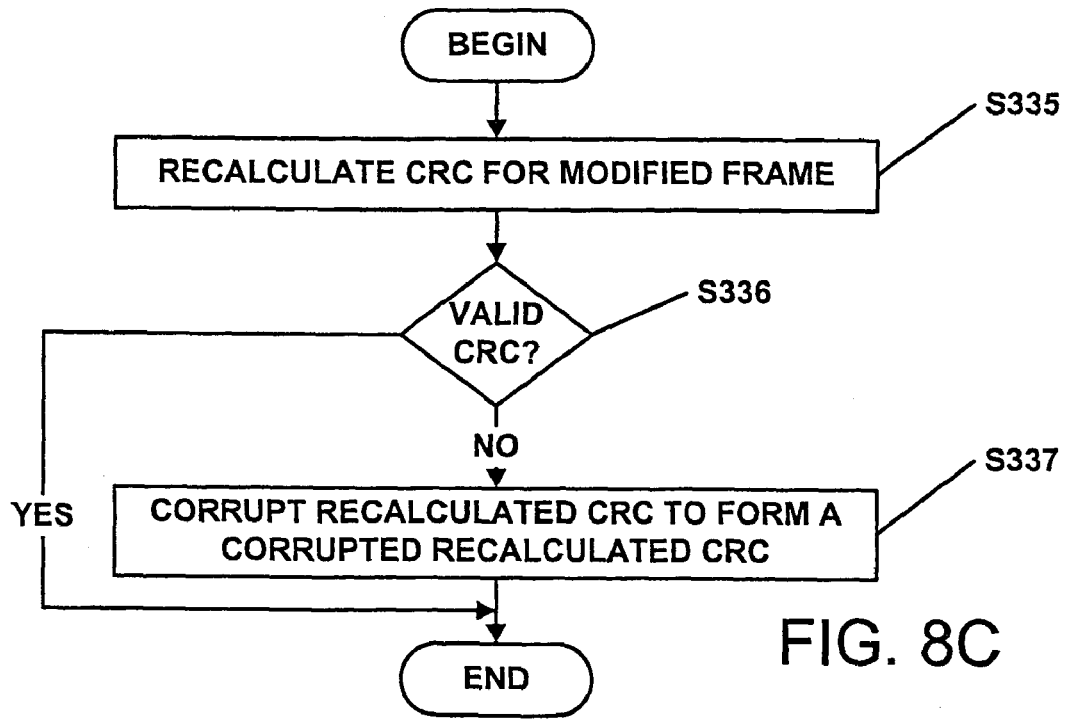
FIG. 8C illustrates a general flowchart of the process for recalculating the cyclic redundancy check.
Figure 8B:
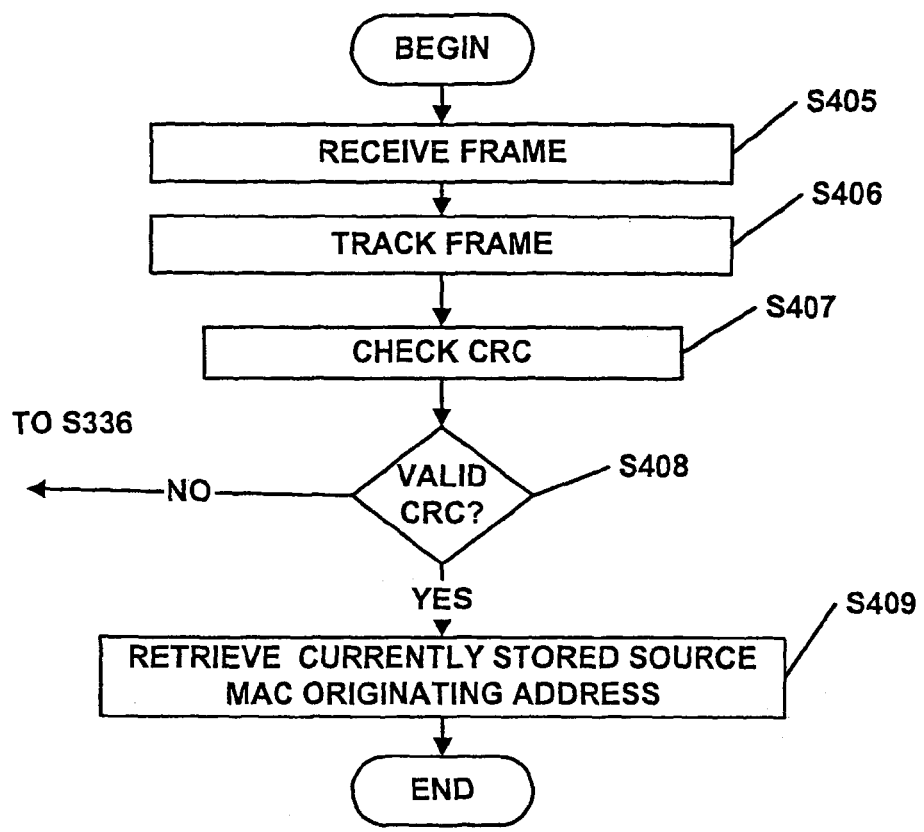
FIG. 8B illustrates a general flowchart of the process for receiving frames from the firewall or shunted network device.
Figure 9:
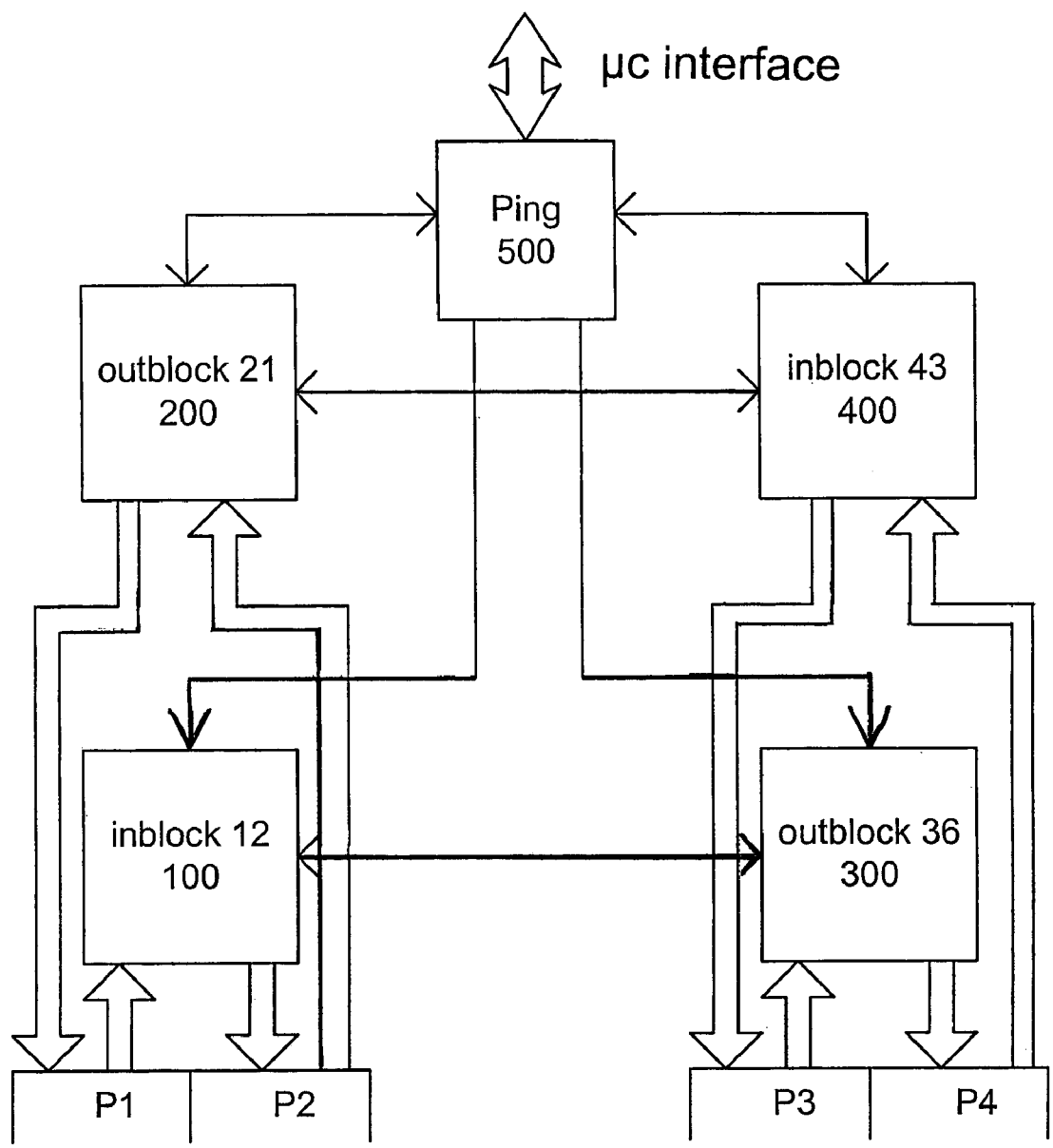
FIG. 9 illustrates a high level block diagram of the repeating and MAC substitution hardware of the device masking shunt using a firewall cloaking mode
Figure 10:
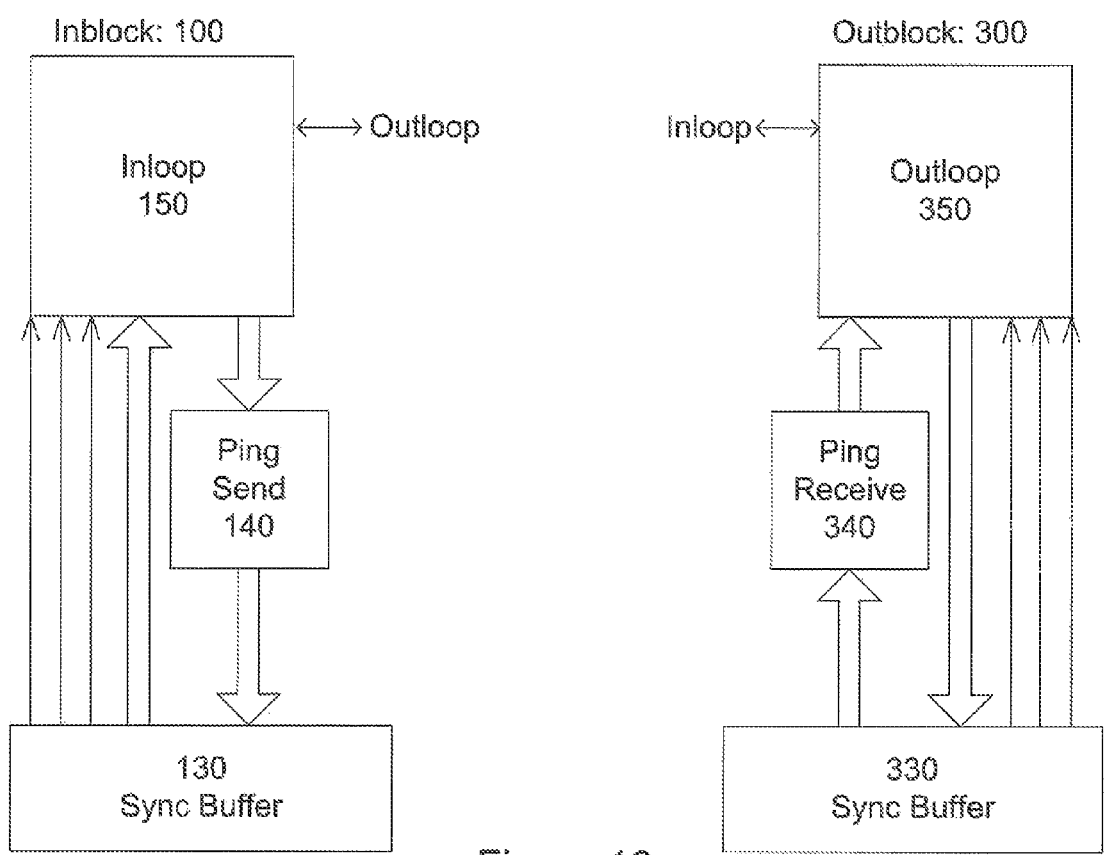
FIG. 10 illustrates a block diagram of a subset of said repeating and MAC substitution hardware, specifically the inblock and outblock hardware used where port 1 is the inbound port and port 4 is the outbound port.
Figure 11:
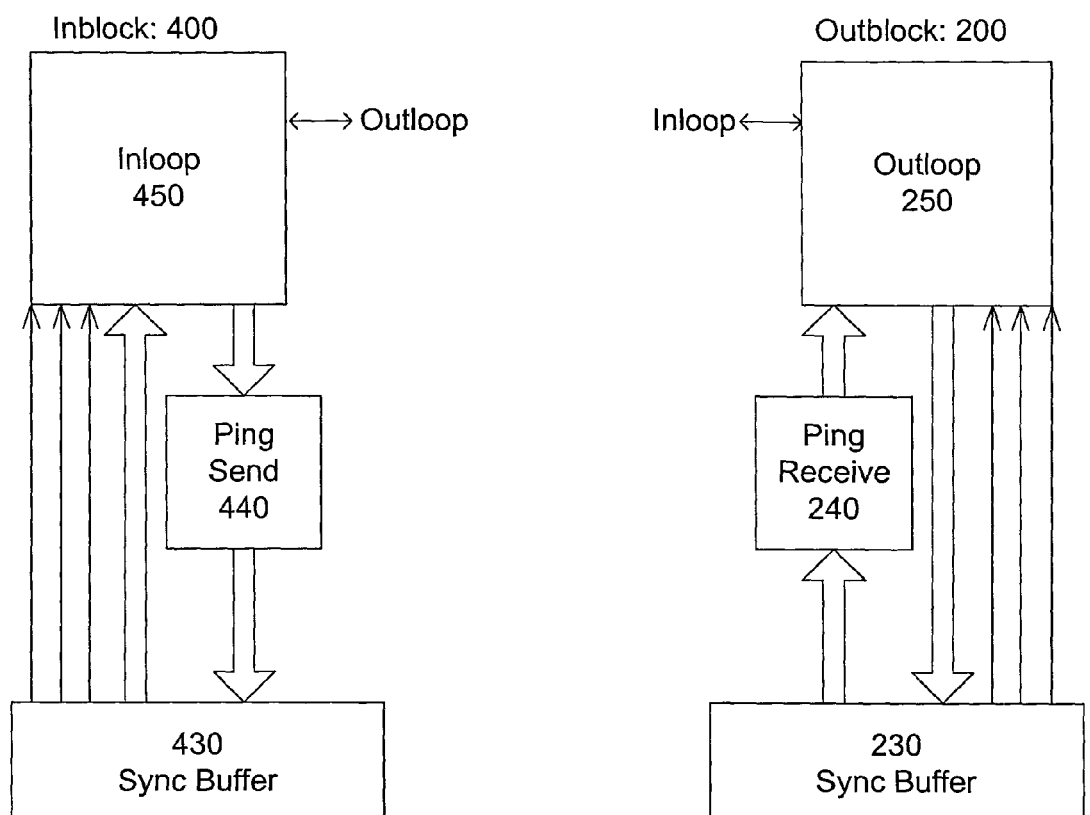
FIG. 11 illustrates a block diagram of a subset of said repeating and MAC substitution hardware, specifically the inblock and outblock hardware used where port 4 is the inbound port and port 1 is the outbound port.
Figure 12:
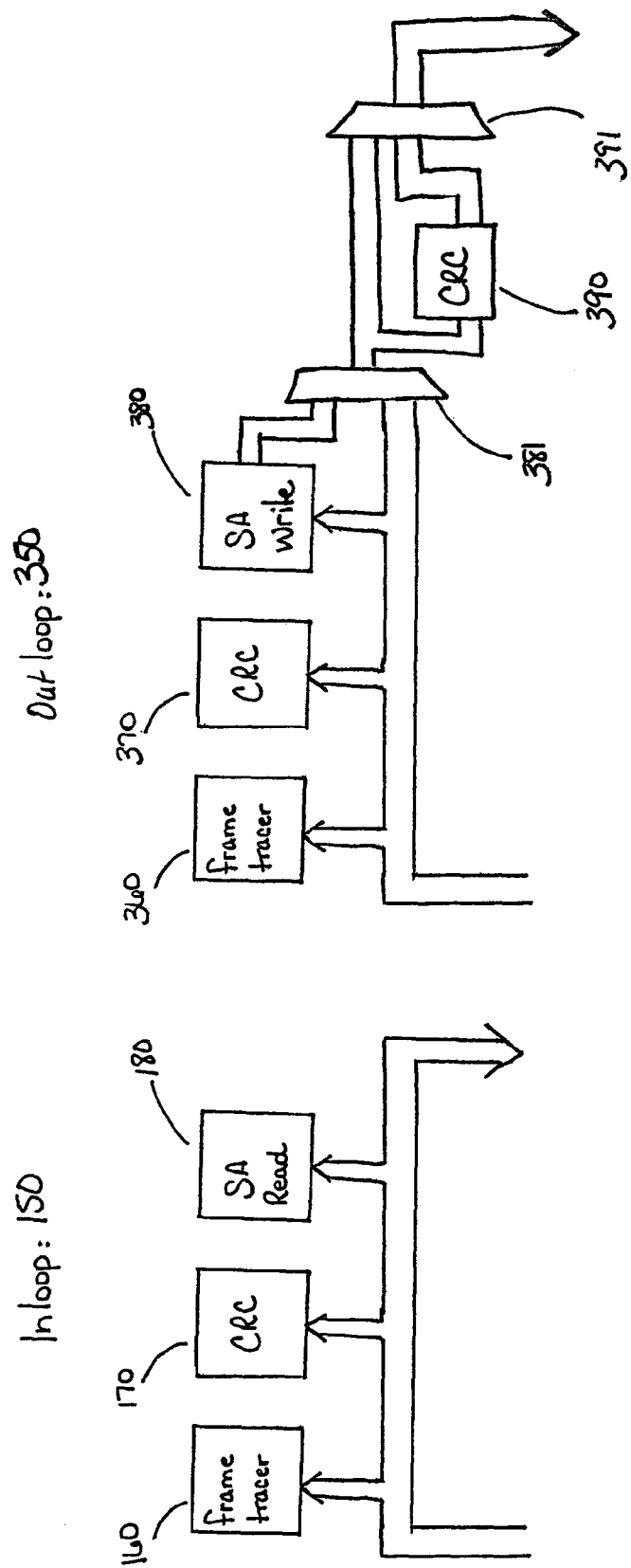
FIG. 12 illustrates a block diagram of the inloop hardware of the inblock shown in FIG. 10 and the outloop hardware shown in FIG. 10.
Figure 13:
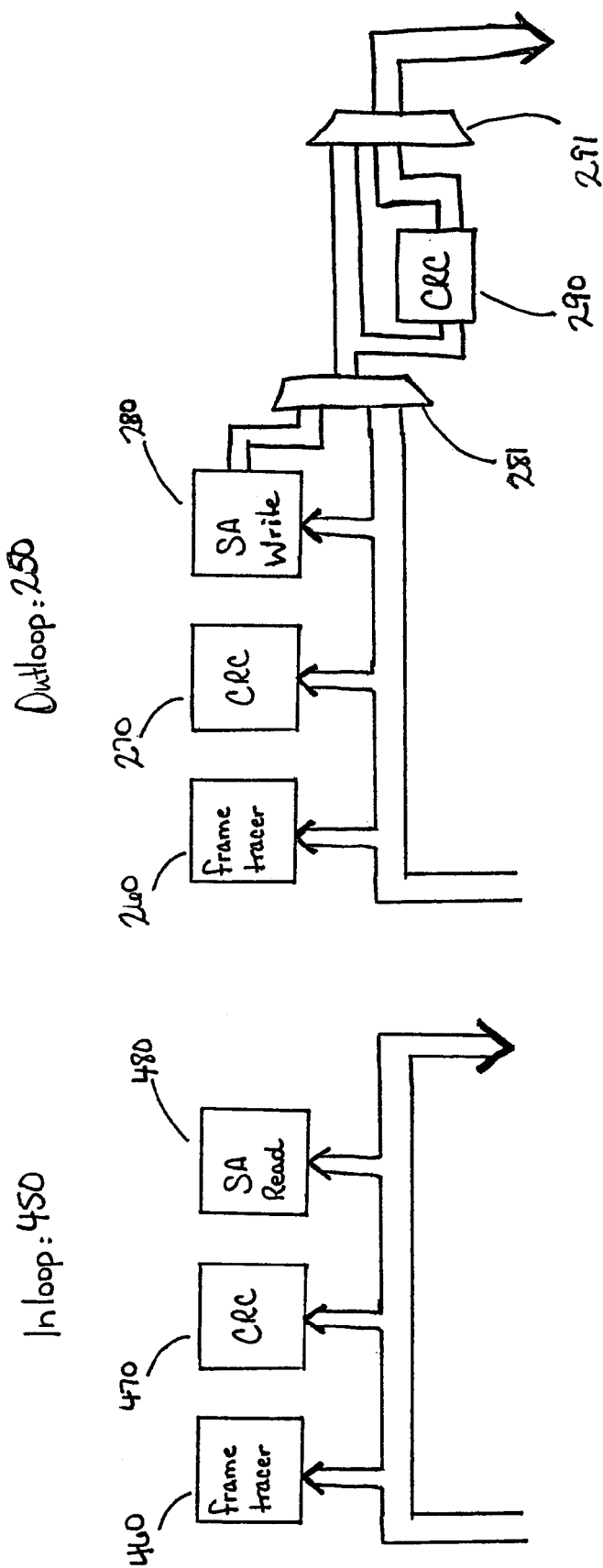
FIG. 13 illustrates a block diagram of the inloop hardware of the inblock shown in FIG. 11 and the outloop hardware shown in FIG. 11.

Referring now to Step S125 or Step S225, the step of receiving frames from the firewall or shunted network device includes the steps identified in FIG. 8B and begins with Step S405. The frame is received at Step S405. Step S405 is followed by Step S406 where FPGA 30 tracks the received frame from port 3 or port 2. Step S406 is followed by Step S707 where the CRC is checked. Step S407 is followed by Step S408 where a determination is made whether the CRC is valid. If the determination is "YES", the stored source MAC originating address is retrieved from the MAC register 45 (if the frame is received from port 3) or the MAC register 46 (if the frame is received from port 2) at Step S309. However, if the determination is "NO", at Step S408, such determination is used for Step S336 of FIG. 8C.

Referring now to Steps S135 (FIG. 6) and S235 (FIG. 7), the recalculating CRC step includes the process set forth in FIG. 8C and begins with Step S335 where the CRC is calculated for the modified frame. Step S335 is followed by Step S336 where a determination is made whether the CRC is valid. If the CRC is valid, the process ends and returns to Steps S140 (FIG. 6) or Step 240 (FIG. 7). On the other hand, if the determination is that the frame from the firewall or the shunted network device has a invalid CRC, then the recalculated CRC is corrupted. In the exemplary embodiment, the last bit of the recalculated CRC is simply inverted. Nevertheless, other means of corruption can be performed.

The DMS 10 functions at the MAC level and will not hide the equipment at the IP level, so it cannot prevent the firewall 102 from giving out its IP address and/or MAC address at the IP level.

The DMS 10 checks the continuity of the firewall 102 to ensure that the network 100 (website) does not go offline via microcontroller 50. If the firewall 102 is disabled by a hacker, looses power or has a major hardware failure that stops the traffic the DMS 10 activates alarm 25. The alarm 25 can be used to signal to another DMS 10 being used as a redundancy switch, to change over, as describe in relation to FIG. 3. Other alarm conditions are described herein.

An exemplary port check between ports 2 and 3 will now be described below. Pre-constructed IP packets (one packet per Ethernet frame) are sent out from port 2 (the secure side of the firewall 102) and port 3 monitors for the arrival of the pre-constructed IP packets. The pre-constructed IP packet would contain some signature in the data that is looked for. If it is not detected, a firewall failure alarm is raised. Successfully detected packets are discarded and not emitted to port 4 in the normal stream. Firewall "pings" occur no less than 1 second and no more than 5 seconds apart in both directions through the firewall 102.

The alarm 25 is activated when 1) the firewall ping fails; 2) Ether network port 1 stops receiving optical signals from the far end connections; 3) the DMS power source 21 (FIG. 4) is switched off or the power fails; 4) the DMS self test or watch dog fails (if applicable); and 5) the alarm 25 is cleared when the fault clears. (If the fault was due to a network or firewall ping failure the alarm signal will be maintained for a minimum of 5 seconds.) With reference to FIG. 5, in the preferred embodiment, an illuminated red LED on the front panel 59 will indicate the alarm active state.

Referring now to FIG. 2, a second configuration of the DMS, herein numbered DMS 10', is shown. In the second configuration, the DMS 10' functions as a redundancy switch. Moreover, in this second configuration, the DMS 10' serves as a wiretap for monitoring the flow of frames therethrough via monitor 80. In this mode under normal operation, data passes transparently through the DMS 10' (less than a 2 bit delay) between port 1 and port 4. In the event of a failure, the DMS 10' switches, via multiplex switch 40, the live port over to port 3 instead of port 4. Network 100A is connected to port 4. Network 100B, which may be the same network as network 100A, is connected to port 3. Port 2 can simultaneously and independently be used as a monitor port and is detailed herein. Redundant operation is equivalent to a switch routing traffic between port 1 and either port 3 or port 4 depending on which switching state of multiplex switch 40.

In the exemplary embodiment, multiplex switch 40 connects, in a normal mode of operation, port 1 to port 4 and, in a backup (redundant) mode, connects port 1 to port 3. The backup (redundant) mode is selected when any of the following conditions are true: 1) The network 100A on port 4 is determined to be "down" and the network 100B on port 3 is "up"; and 2) the cascade input on line L14 is activated and the network on port 3 is "up".

The DMS 10' uses the presence of a received optical signal on a port to decide if the link is up. There is no need to complete any pending frame transmission before switching. Incomplete frames are discarded by any receivers and re-send is handled by higher level protocols.

In the normal mode through switch 40, ports 1 and 4 are connected. Thus, frames received on port 1 are forwarded on port 4 verbatim. Likewise, frames received on port 4 are forwarded on port 1 verbatim. Frames received on port 3 are discarded (the frame receiver can be disabled).

In the backup (redundancy) mode through switch 40 ports 1 and 3 are connected. Thus, frames received on port 1 are forwarded on port 3 verbatim. Likewise, frames received on port 3 are forwarded on port 1 verbatim. Frames received on port 4 are discarded (the frame receiver can be disabled).

In the exemplary embodiment, the alarm output on line L12 is disabled in this mode. The cascade input L14 is active in this mode and operation is dependant on switch S3.

Control switch S2 includes two states, one for Inbound traffic monitoring and one for Outbound traffic monitoring. The Inbound traffic is received on port 1 while the Outbound traffic goes out of port 1.

Referring now to FIG. 3, the defensive intrusion detection system is shown. In the defensive intrusion detection system three DMSs A, B and C are interconnected. The DMS A function in accordance with the redundancy and monitoring mode described above in relation to FIG. 2. However, instead of connecting the ports 3 and 4 of the multiplex switch 40 to the secure network directly, the ports 3 and 4 are coupled to DMSs B and C configured for the firewall cloaking mode.

Because the redundancy and monitoring functions of the redundancy and monitoring mode uses non-overlapping resources, such functions are operated simultaneously. The monitoring function monitors traffic with respect to port 1 because traffic can arrive from either of port 3 or port 4 via multiplex switch 40. A data monitor 80 is connected to port 2 to view data traffic on port 1. The monitor 80 can view this traffic either entering port 1 or leaving port 1 and the direction is set via control switch S2. In the redundancy and monitoring mode no data traffic is sent from port 2.

The frame forwarding includes an Inbound mode where the frames received on port 1 of DMS A are simultaneously forwarded to one of ports 3 or 4 and port 2 verbatim of DMS A. The frames received on ports 3 or 4 of DMS A are forwarded on port 1 of DMS B or C verbatim. Frames received on port 2 are discarded (the frame receiver can be disabled). The frame forwarding also includes in an Outbound mode where frames are received at ports 3 or 4 of DMS A and are forwarded to port 1 and port 2 verbatim of DMS A. The frames received on port 2 are discarded (the frame receiver can be disabled).

Most LANs connect to the internet through a single gateway. This is due to the inherent tree structure of Ethernet networks. Loops are not permitted. This means the internet connection is prone to disruption if this single point fails. The following redundant architecture of the defensive intrusion detection system prevents the likelihood of outage caused by a system failure. This failure could be a legitimate hardware or software failure or it could be due to external hackers, viruses or worms.

DMS B is used to monitor the primary firewall and network connections. If there is a failure an alarm signal is sent to DMS A, which switches the internet connection over to a backup firewall (DMS C) and its associated gateway. When DMS B detects that the fault has gone it clears the alarm. DMS A then switches back after a fixed delay.

The delay is there to prevent the possibility of a rapid oscillation of the switch. This could happen if the primary firewall is flooded and DMS B cannot get its pings through in time. It would generate an alarm causing DMS A to switch over. Once the load is taken off the primary firewall the pings will get through and the alarm will be cleared. The load switched back to the primary firewall and the cycle repeated. A delay does not prevent the oscillation it just slows it down. This example also highlights the fact that this setup does not prevent the gateway from being flooded. It does however prevent an outage caused by any failure in the primary firewall or network connection.

Referring now to FIGS. 9, 10, 11, 12 and 13, the FPGA 30 is comprised of inblock-12 100, outblock-34 200, inblock-43 400, outblock-21 200 and ping control module 500. While the following describes the respective operation and relationship between the modules shown in FIGS. 10 and 12, the same description applies, respectively, to the modules shown in FIGS. 11 and 13.

Inblock-12 100 is used for recording the port 1 incoming MAC SA and sending a ping message through firewall 102 via port 2. Outblock-34 300 is used for substituting the outgoing MAC SA from the firewall 102 received at port 3 with the recorded MAC SA and detecting the ping messages. Ping control module 500 controls the ping send module 140 and ping receive module 340 and acts as a slave to the microcontroller 50. The naming of inblock and outblock modules reflect the direction of the dataflow, to-wit: inblock-12 100 is forwarding data from port 1 to port 2 and outblock-34 300 is forwarding data from port 3 to 4.

Inblock-12 100 feeds outblock-34 200 with port 1 inbound MAC SA (for which the CRC is correct) for later use as a substitute MAC SA for a frame received on port 3 and repeated to port 4. Likewise, inblock-43 400 feeds outblock-34 200 with port 4 inbound MAC SA (for which the CRC is correct) for later as a substitute MAC SA for a frame received on port 2 and repeated to port 1. Outblock-34 300 stores the MAC SA fed from inblock-12 100 in MAC register 45. Likewise, outblock-21 200 stores the MAC SA fed from inblock-43 400 in MAC register 46.

Inblock-12 100 consists of three modules, to-wit: sync buffer 130, ping send 140 and inloop 150.

Sync buffer module 130 synchronizes the data flow from port 1 with the clock environment on the FPGA 30. Ping send 140 acts as a switch or multiplexer, passing data from inloop 150 to sync buffer 130 when not active, but sends the data it gets from ping control 500 when ping is active.

Inloop 150 passes the data directly to its output, only monitoring the data flow.

Outblock 350 also consists of three modules, quite similar to inloop 150, to-wit: sync buffer 330, ping receive 340 and outloop 350. Sync buffer 330 is, like sync buffer 130, used to synchronize the date flow from port 3 with the clock environment on FPGA 30. Ping receive 340 copies everything it receives to ping control 500, but otherwise it passes the data on to outloop 350.

There is a choice of three security options for not letting a valid ping packet to outside world. They are, in order of increasing security: scramble CRC, block CRC transmission and block frame.

Scramble CRC inverts the nibbles of CRC after the frame has been identified as a ping packet. Block CRC transmission truncates the frame resulting in an invalid frame. Block frame blocks the first frame appearing on the receive port after ping sending started. This last mode assumes a lot about the firewall. The (first) ping is sent only if there has not been any traffic for 0.5 s, so it is unlikely that there is anything in the firewall buffers waiting to be sent. Thus, the first packet appearing should be the ping packet. If there is data immediately following the ping packet, the packet order might be switched in the firewall 102, so there is a potential security issue (data packet being blocked and ping packet being sent). This last option should only be used if the firewall 102 acts as assumed.

Outloop 350 substitutes the MAC SA with the SA copied from inloop 150 and calculates a new CRC for the frame.

Inloop 150 has three modules, to-wit: frame tracker 160, CRC 170 and SA read 180.

Frame tracker 160 acts as the controller, based on the frame pointer. It detects the frame start and starts counters and activates the control signals at the right times for other modules (CRC 170 and SA read 180). CRC 170 calculates a CRC for the whole frame and SA read 180 is active only during the SA field. There are two counters, one counting up to the length field and the other taking over after the frame length has been read and loaded to the counter. Frame tracker 160 informs SA read 180 about the frame end so SA read 180 should copy the SA to SA write 380 in the MAC register 45 of outloop 350 if CRC 170 calculated a valid CRC. (In other words, control anded with CRC).

CRC 170 checks the validity of the data flowing on the bus in inloop 150 and allows SA register copying if there were no errors. (In other words, control anded with frame tracker).

SA read 180 copies the data nibbles to a register and when instructed so (frame tracker and CRC votes), asserts a copy signal to SA write 380 module (this might be postponed if outloop 350 is just writing SA to outgoing frame). When SA read receives acknowledgement, the copy signal is deasserted.

Outloop 350 is a bit more complex than inloop 150. Outloop 350 is comprised of frame tracker 360, CRC (for data validity check) 370, SA write 380 and CRC (for recalculating CRC after SA substitution) 390.

Frame tracker 360 is identical to the inloop frame tracker 160.

CRC (for validity check) 370 is used to verify that the original data is OK. If it is not, the outgoing CRC must not be valid either. While the CRC (for recalculating CRC after SA substitution) 390 produces a valid CRC regardless of the original CRC validity, whenever CRC (for validity check) 370 indicates an invalid frame, CRC (for recalculating CRC after SA substitution) causes the last nibble of the outgoing CRC to invert.

SA write 380 simply puts the MAC register 45 contents on the line and the multiplexer 381 selects that as the data source during the SA field.

CRC (for recalculating CRC after SA substitution) 390 calculates the checksum to reflect the changed data with the substituted SA. The CRC (for recalculating CRC after SA substitution) 390 output is inserted after the data field and the multiplexer 391 switches to CRC for recalculating CRC after SA substitution) 390 input during the CRC field or segment of the frame.

Ping control unit 500 acts as a slave to the microcontroller 50 and controls ping send 140, ping receive 340, ping receive 440 and ping send 240. Ping control module 500 contains two sets (one for each direction) of quadruple frame buffers (one for storing the ping message to be sent, one identical to this for comparing to the received frame, one for receiving the frame and one for sending the received frame to the microcontroller. The multiple buffers are needed since the memory can be read at one location at a time. The frame buffer hold the minimum length Ethernet frames to accommodate ping frames, the tails of longer frames are discarded. The comparison of sent and received frames are done on the fly and decision about matching is made on the last nibble of the data field, before CRC.

In the exemplary embodiment, the FPGA 30 is an XILINX Spartan-IIE, and the network T/R 31 is an Intel LXT974 (Quad Transceiver) and the microcontroller 50 is a MICROCHIP PIC16F87XA.

It is noted that the embodiment described herein in detail, for exemplary purposes, is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not a limiting sense.

What is claimed is:

1. A device masking shunt for communication networks comprising:
    a capture and store module configured to capture and store in a plurality of registers a first media access control (MAC) originating address of an inbound network frame and a second MAC originating address of an outbound network frame; and
    an address substitution module configured to substitute a device MAC originating address in each outbound frame of a network device with the stored first MAC originating address when the outbound frame is related to the inbound network frame and the stored second MAC originating address when the outbound frame is related to the outbound network frame to conceal an identity of said network device.

2. The shunt in accordance with claim 1, wherein said network device comprises a network card.

3. The shunt in accordance with claim 1, further comprising: a re-calculator module configured to recalculate a cyclic redundancy check (CRC) for said outbound frame of said network device; and a frame re-assembler module configured to reassemble said outbound frame with the recalculated CRC.

4. The shunt in accordance with claim 1, wherein said address substitution module is configured to substitute a currently stored first or second MAC originating address in accordance with a first in, first out protocol.

5. The shunt in accordance with claim 1, wherein said network device is a firewall which passes or fails said inbound and outbound network frames.

6. The shunt in accordance with claim 5, further comprising: a microprocessor configured to monitor the integrity of the firewall.

7. The shunt in accordance with claim 6, further comprising: an alarm module configured to generate an alarm when the firewall goes offline, is disabled, looses power or has a hardware failure.

8. A multiconfigurable device masking shunt for a visible network device having a predetermined media access control (MAC) address on a secure network comprising:
    means for cloaking said network device to conceal said predetermined MAC address, and rendering said network device invisible, in a first mode, to upstream and downstream relay devices;
    a transceiver;
    means for passing inbound and outbound traffic through one of two alternate paths to said secure network, in a second mode, via said transceiver;
    a first port for receiving the inbound traffic from said upstream relay device;
    a second port adapted to be coupled to said network device, in said first mode, for communicating said inbound traffic from said upstream relay device or a monitor in said second mode;
    a third port adapted to be coupled to said network device in said first mode or said downstream relay device in said second mode;
    a fourth port adapted to be coupled to said downstream relay device to communicate inbound and outbound traffic; and
    a switch coupled to said first port, said third port and said fourth port for switching said inbound and outbound traffic between said first port and one of said third port and said fourth port
    wherein said cloaking means comprises: a capture and store module configured to capture and store in a plurality of registers a first media access control (MAC) originating address of an inbound network frame and a second MAC originating address of an outbound network frame; and an address substitution module configured to substitute a device MAC originating address in each outbound frame of said network device with the stored first MAC originating address when the outbound frame is related to the inbound network frame and the stored second MAC originating address when the outbound frame is related to the outbound network frame to conceal an identity of said network device.

9. The shunt in accordance with claim 8, wherein said network device comprises a network card.

10. The shunt in accordance with claim 8, wherein said cloaking means further comprises: a re-calculator module configured to recalculate a cyclic redundancy check (CRC) for said outbound frame of said network device; and a re-assembler module configured to reassemble said outbound frame with the recalculated CRC.

11. The shunt in accordance with claim 8, wherein said frame substitution module is configured to substitute a currently stored first or second MAC originating address in accordance with a first in, first out protocol.

12. The shunt in accordance with claim 8, wherein said network device is a firewall which passes or fails said inbound and outbound network frames.

13. The shunt in accordance with claim 8, further comprising: a microprocessor configured to monitor the integrity of the firewall.

14. The shunt in accordance with claim 13, further comprising: an alarm module configured to generate an alarm when the firewall goes offline, is disabled, looses power or has a hardware failure.

15. The shunt in accordance with claim 8, wherein said shunt is configured to monitor said inbound traffic or said outbound traffic, in said second mode.

16. A system for communication networks comprising:
a primary device masking shunt configured to cloak an identity of a first network device;
a secondary device masking shunt configured to cloak an identity of a second network device; and
a monitoring device masking shunt configured to invisibly monitor traffic through said first network device and communicate invisibly said monitored traffic through said first network device wherein upon detection of degraded performance of said first network device, said monitoring device masking shunt configured to switch paths to invisibly monitor traffic through said second network device and communicate invisibly said monitored traffic through said second network device
wherein each of said primary and secondary device masking shunts comprises: a capture and store module configured to capture and store a first media access control (MAC) originating address of an inbound network frame and a second MAC originating address of an outbound network frame: and an address substitution module configured to substitute a device MAC originating address in each outbound frame of, in the case of said primary shunt, said first network device and, in the case of said secondary shunt, said second network device, with the stored first MAC originating address when the outbound frame is related to the inbound network frame and the stored second MAC originating address when the outbound frame is related to the outbound network frame to conceal an identity of said network device.

17. The system in accordance with claim 16, wherein said first network device comprises a first network card and said second network device comprises a second network card.

18. The system in accordance with claim 16, further comprising: a re-calculator module configured to recalculate a cyclic redundancy check (CRC) for said outbound frame of each of said first and second network devices; and a frame re-assembler module configured to reassemble said outbound frame with the recalculated CRC.

19. The system in accordance with claim 16, wherein said substitution module is configured to substitute a currently stored first or second MAC originating address in accordance with a first in, first out protocol.

20. The system in accordance with claim 16, wherein said first network device is a first firewall which passes or fails said inbound and outbound network frames and wherein said second network device is a second firewall which passes or fails said inbound and outbound network frames.

21. The system in accordance with claim 20, further comprising: means for monitoring the integrity of said first firewall and said second firewall.

22. The system in accordance with claim 20, further comprising: an alarm module configured to generate an alarm when either of said first or second firewalls goes offline, is disabled, looses power or has a hardware failure.

23. The method of shunt masking a network device of a communication network comprising the steps of:
capturing a first media access control (MAC) originating address of an inbound network frame and a second MAC originating address of an outbound network frame;
storing, in a plurality of registers, said first MAC originating address of said inbound network frame and said second MAC originating address of said outbound network frame; and
substituting a device MAC originating address in each outbound frame of a network device with the stored first MAC originating address when the outbound frame is related to the inbound network frame and the stored second MAC originating address when the outbound frame is related to the outbound network frame to conceal an identity of said network device.

24. The method in accordance with claim 23, wherein said network device comprises a network card.

25. The method in accordance with claim 23, further comprising the steps of: recalculating a cyclic redundancy check (CRC) for said outbound frame of said network device; and reassembling said outbound frame with the recalculated CRC.

26. The method in accordance with claim 23, wherein the substituting step comprises the step of: substituting a currently stored first or second MAC originating address in accordance with a first in, first out protocol.

27. The method in accordance with claim 23, wherein said network device is a firewall which passes or fails said inbound and outbound network frames.

28. The method in accordance with claim 27, further comprising the step of: monitoring the integrity of the firewall.

29. The method in accordance with claim 28, further comprising the step of: generating an alarm when the firewall goes offline, is disabled, looses power or has a hardware failure, in response to the monitoring step.

30. A method of multiconfiguring device masking shunt operations for a visible network device having a predetermined media access control (MAC) address on a secure network comprising:
cloaking said network device to conceal said predetermined MAC address, and rendering said network device invisible, in a first mode, to upstream and downstream relay devices;
passing inbound and outbound traffic through one of two alternate paths to said secure network, in a second mode;
receiving the inbound traffic from said upstream relay device on a first port;
communicating said inbound traffic from said upstream relay device from a second port adapted to be coupled to said network device, in said first mode, or a monitor in said second mode;
communicating said inbound and outbound traffic from a third port adapted to be coupled to said network device in said first mode or to said downstream relay device in said second mode; communicating said inbound and outbound traffic from a fourth port adapted to be coupled to said downstream relay device in both said first and second modes; and switching between said third port and said fourth port in said second mode in response to monitoring said inbound and outbound traffic
wherein the cloaking step comprises the steps of:
capturing and storing in a plurality of registers a first media access control (MAC) originating address of an inbound network frame and a second MAC originating address of an outbound network frame; and substituting a device MAC originating address in each outbound frame of said network device with the stored first MAC originating address when the outbound frame is related to the inbound network frame and the stored second MAC originating address when the outbound frame is related to the outbound network frame to conceal an identity of said network device.

31. The method in accordance with claim 30, wherein said network device comprises a network card.

32. The method in accordance with claim 30, wherein cloaking step further comprises the steps of: recalculating a cyclic redundancy check (CRC) for said outbound frame of said network device; and reassembling said outbound frame with the recalculated CRC.

33. The method in accordance with claim 32, wherein the substituting step includes the step of: substituting a currently stored first or second MAC originating address in accordance with a first in, first out protocol.

34. The method in accordance with claim 32, wherein said network device is a firewall which passes or fails said inbound and outbound network frames.

35. The method in accordance with claim 34, further comprising the step of: monitoring the integrity of the firewall.

36. The method in accordance with claim 35, further comprising the step of: generating an alarm when the firewall goes offline, is disabled, looses power or has a hardware failure, in response to the monitoring step.

37. The method in accordance with claim 30, further comprising: monitoring said inbound traffic or said outbound traffic, in said second mode.

38. The method in accordance with claim 30, wherein said network device is a firewall which passes or fails said inbound and outbound traffic.

39. A method for a communication network with a visible first network device and a visible second network device comprising the steps of:
concealing an identity of said first network device; concealing an identity of said second network device;
invisibly monitoring traffic through said first network device and communicating invisibly said monitored traffic through said first network device;
detecting degraded performance of said first network device; and
in response to the detection of the degraded performance, switching communication paths to invisibly monitor traffic through said second network device and communicate invisibly said monitored traffic through said second network device
wherein each of the concealing steps comprises the steps of: capturing and storing in a plurality of registers a first media access control (MAC) originating address of an inbound network frame and a second MAC originating address of an outbound network frame; and substituting a device MAC originating address in each outbound frame of, respectively, said first or second network device with the stored first MAC originating address when the outbound frame is related to the inbound network frame and the stored second MAC originating address when the outbound frame is related to the outbound network frame to conceal an identity of, respectively, said first or second network device.

40. The method in accordance with claim 39, wherein said first network device comprises a first network card and wherein said second network device comprises a second network card.

41. The method in accordance with claim 39, further comprising the steps of: recalculating a cyclic redundancy check (CRC) for said outbound frame of said network device; and reassembling said outbound frame with the recalculated CRC.

42. The method in accordance with claim 39, wherein the substituting step includes the step of: substituting a currently stored first or second MAC originating address in accordance with a first in, first out protocol.

43. The method in accordance with claim 39, wherein said first network device is a first firewall which passes or fails said inbound and outbound network frames and wherein said second network device is a second firewall which passes or fails said inbound and outbound network frames.

44. The method in accordance with claim 43, further comprising the step of: monitoring, using a microprocessor, the integrity of said first and second firewalls.

45. The method in accordance with claim 43, further comprising the step of: generating an alarm when, respectively, said first or second firewall goes offline, is disabled, looses power or has a hardware failure, in response to the monitoring step.

46. A device masking shunt for communication networks comprising:
first and second capture and store media access control (MAC) address modules which capture and store in a plurality of registers a first media access control (MAC) originating address of an inbound network frame and a second MAC originating address of an outbound network frame; and
a first MAC address substitution and frame re-assembler module which substitutes a device MAC originating address in each outbound frame of a network device with the stored first MAC originating address when the outbound frame is related to the inbound network frame; and
a second MAC address substitution and frame re-assembler module which substitutes a device MAC originating address in each outbound frame of the network device with the stored second MAC originating address when the outbound frame is related to the outbound network frame to conceal an identity of said network device.

47. The shunt in accordance with claim 46, wherein said first and second capture and store media access control (MAC) address modules and said first and second MAC address substitution and frame re-assembler modules are implemented using a field programmable gated array.

* * * * *